United States Patent Office 3,154,667
Patented Oct. 27, 1964

3,154,667
HEATING PROCESS
Ronald Barron Mooney, Widnes, England, assignor to Imperial Chemical Industries Limited, London, England, a corporation of Great Britain
No Drawing. Filed May 16, 1960, Ser. No. 29,159
Claims priority, application Great Britain, May 27, 1959, 18,040/59
6 Claims. (Cl. 219—279)

This invention relates to the superheating of sulphur vapour.

The superheating of sulphur vapour at comparatively low temperatures of up to 700° C. is not unduly complicated in that the superheated can utilise such normal materials of construction as cast iron and calorised mild steel. However, at higher temperatures than 700° C. the problem of providing a convenient method of superheating the vapour is an extremely vexatious one, owing to the very corrosive nature of sulphur vapour at these higher temperatures.

According to the present invention a process for superheating sulphur vapour comprises passing sulphur vapour at an inlet temperature not exceeding 700° C. over the surface of a body of an electrically heated, substantially non-volatile, inert, fused salt or mixture of salts maintained at a temperature in excess of 700° C. contained in a vessel having a refractory lining.

Salts or mixtures of salts of widely different physical and chemical structure may be used provided they are substantially non-volatile and inert to the sulphur vapour at the operating temperature. For example, there may be used an alkaline earth metal halide such as calcium chloride or a silicate glass which may be regarded basically as a sodium calcium silicate.

Before passing the sulphur vapour over the molten salt in the manner of the present invention the sulphur vapour may be preheated in accordance with conventional methods, for example, to a temperature of 700° C. by passing through calorised mild steel tubes contained in a fuel-fired furnace.

It should be appreciated that the sulphur vapour is passed over and not through the body of the molten salt as considerably more heat is picked up by the sulphur from the walls of the vessel than would be picked up by the sulphur vapour passing through the molten salt.

One suitable manner of heating the salt is by means of stub electrodes fitted through the floor or the sides or roof of a refractory-lined tunnel containing a body of the salt, the electrodes terminating below the surface of the salt and being provided with a source of alternating current. The sulphur vapour acquires heat not only from the surface of the molten salt but also by conduction and convection from the walls of the vessel, which vessel in turn has acquired heat by radiation from the molten salt surface.

What we claim is:
1. A process for superheating sulphur vapour which comprises passing sulphur vapour at an inlet temperature not exceeding 700° C. over the surface of a body of at least one electrically heated, substantially non-volatile, inert, fused salt maintained at a temperature in excess of 700° C. contained in a vessel having a refractory lining.
2. A process as described in claim 1 in which the sulphur vapour has been preheated to a temperature not exceeding 700° C. by passing through calorised mild steel tubes contained in a fuel-fired furnace.
3. A process as described in claim 1 in which the fused salt is calcium chloride.
4. A process as described in claim 1 in which the fused salt is a silicate glass.
5. A process as described in claim 1 in which the sulphur vapour is passed through a refractory-lined tunnel containing the molten salt, the latter being heated by means of electrodes terminating below the surface of the salt, the electrodes being provided with a source of alternating current.
6. A process for superheating sulphur vapor which comprises preheating sulphur vapor to a temperature not exceeding 700° C. by passing sulphur vapor through calorized mild steel tubes, and then passing said preheated sulphur vapor at an inlet temperature not exceeding 700° C. over the surface of at least one electrically heated and substantially nonvolatile inert fused salt body maintained at a temperature in excess of 700° C. and contained in a vessel having a refractory lining, said salt being selected from the group consisting of calcium chloride and sodium calcium silicate.

References Cited by the Examiner
UNITED STATES PATENTS

| | | | |
|---|---|---|---|
| 2,187,393 | 1/40 | Simo | 23—206 |
| 2,229,554 | 1/41 | Cummings | 122—32 |
| 2,701,269 | 2/55 | Holden | 13—23 |
| 2,787,592 | 4/57 | Burkhardt | 13—23 |

RICHARD M. WOOD, Primary Examiner.
MILTON O. HIRSHFIELD, Examiner.